(12) United States Patent
Schlesser et al.

(10) Patent No.: US 7,862,068 B2
(45) Date of Patent: Jan. 4, 2011

(54) PIN CONSTRUCTED FOR CONNECTING A JACK TO AN IMPLEMENT DRAFT TONGUE AND FOR SUPPORTING A PTO DRIVE SHAFT ASSEMBLY

(75) Inventors: Walter Mark Schlesser, Ottumwa, IA (US); Todd Aeschliman, Ottumwa, IA (US)

(73) Assignee: Deere & Company, Moline, IL (US)

( * ) Notice: Subject to any disclaimer, the term of this patent is extended or adjusted under 35 U.S.C. 154(b) by 735 days.

(21) Appl. No.: 11/846,645

(22) Filed: Aug. 29, 2007

(65) Prior Publication Data

US 2009/0057516 A1 Mar. 5, 2009

(51) Int. Cl.
*B60D 1/66* (2006.01)

(52) U.S. Cl. ..................................... 280/475; 180/53.3

(58) Field of Classification Search ................. 280/475, 280/763.1, 764.1, 765.1, 766.1; 180/53.1, 180/53.3
See application file for complete search history.

(56) References Cited

U.S. PATENT DOCUMENTS 2,956,808 A * 10/1960 Miller .......................... 239/670
4,579,363 A * 4/1986 Allen et al. .................. 280/474

* cited by examiner

*Primary Examiner*—Kevin Hurley

(57) ABSTRACT

A towed, PTO-driven implement is equipped with a jack that can be selectively coupled to the draft tongue either in a working position at a forward region of the tongue, or in a stored position at a rearward region of the tongue. A PTO drive shaft assembly extends over the draft tongue and a pin for releasably connecting the jack to the tongue incorporates a PTO drive shaft assembly support which is positioned so as to support the PTO drive shaft assembly when the jack is in either of its working or stored positions.

5 Claims, 4 Drawing Sheets

US 7,862,068 B2

PIN CONSTRUCTED FOR CONNECTING A JACK TO AN IMPLEMENT DRAFT TONGUE AND FOR SUPPORTING A PTO DRIVE SHAFT ASSEMBLY

FIELD OF THE INVENTION

The present invention relates to PTO driven equipment, and more specifically relates to drawn implements which include a draft tongue that is supported by a jack when the implement is disconnected from a towing vehicle.

BACKGROUND OF THE INVENTION

It is common place to have an implement which has both a PTO drive line for supplying power to driven apparatus of the implement and a jack to support the draft tongue of the implement when not in use, a parked mode, for example. The jack is typically stored in a different location when the implement is in use, a field mode, for example. A pin is often used to secure the jack in either location.

Not all implements have a structure, i.e., a PTO drive shaft assembly holder, for supporting a forward end of the PTO drive shaft assembly when the implement is in its parked mode. Implements without a PTO drive shaft assembly holder increase the risk of PTO drive shaft assembly damage/contamination when the implement is parked. Therefore, in the absence of a PTO drive shaft assembly holder, it is common practice for an operator to either use the draft tongue or the jack handle as a support for the PTO drive shaft assembly. However, if the forward end of the PTO drive shaft assembly is resting on the tongue, this may result in the hitch pin hole being obscured, thus making it difficult to view the hitch pin hole when connecting the implement to the drawbar of a towing tractor. If the forward end of the PTO drive shaft assembly is placed on the jack handle, it is difficult for the operator to adjust the jack in order to adjust the implement hitch height if this is necessary to match up with the drawbar.

To address the above-noted shortcomings of not having a PTO drive shaft assembly holder, it is known to provide a PTO drive shaft assembly holder typically having several parts that work together to either support the PTO drive shaft assembly or allow the holder itself to be relocated out of the working area of the PTO drive shaft assembly. Of course, there is an additional cost to providing a PTO drive shaft assembly holder on an implement.

SUMMARY OF THE INVENTION

According to the present invention, there is provided a towed, PTO-driven implement equipped with a jack for supporting the implement tongue, and a PTO drive shaft assembly holder for supporting the PTO drive shaft assembly when the implement is in a parked mode.

An object of the invention is to provide a jack and PTO drive shaft assembly holder which are of an economical design. This object is achieved by incorporating the PTO drive shaft assembly holder into the connecting pin used for selectively securing the jack either in an operating position or in a stored position. In the stored position, the connecting pin can be used to support a section of the PTO drive shaft assembly during servicing the PTO drive shaft assembly.

These and other objects will be apparent from a reading of the ensuing description together with the appended drawings.

DESCRIPTION OF THE PREFERRED EMBODIMENT

Figure 1:
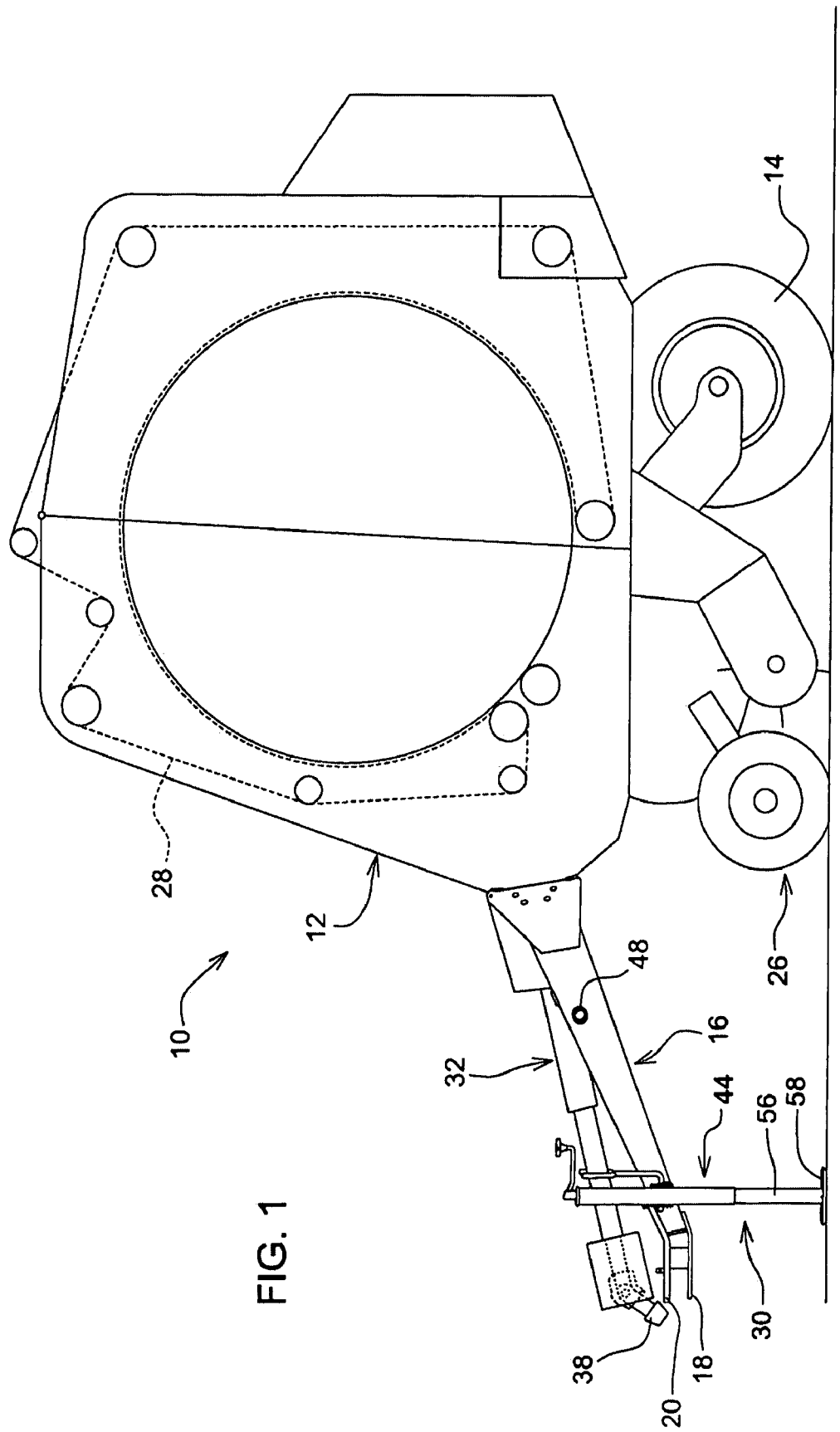
FIG. 1 is a left side view of a towed, PTO-driven, large round baler shown in a parked mode wherein the draft tongue is supported by a jack having a connecting pin serving also as a PTO drive shaft assembly support.
Figure 2:
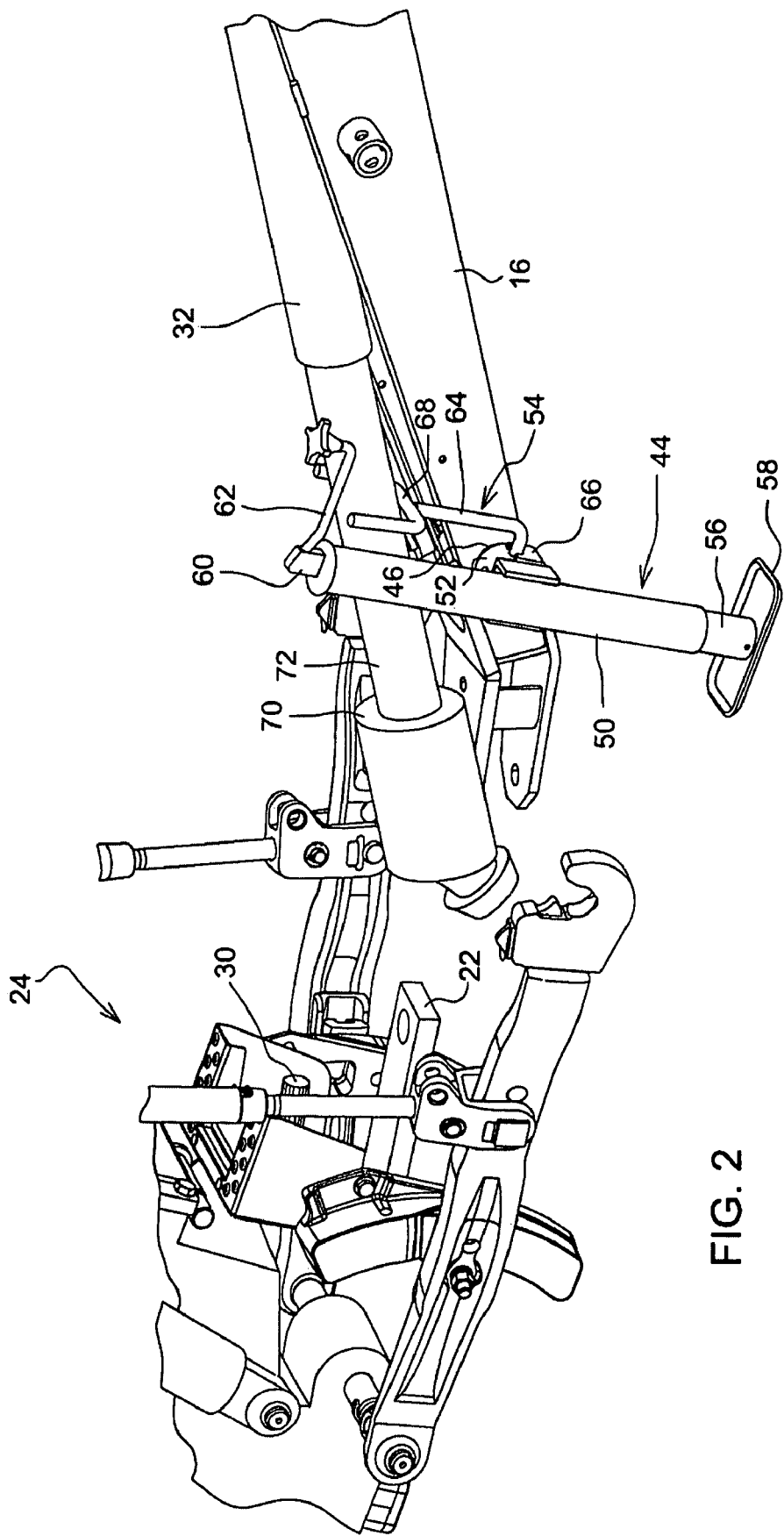
FIG. 2 is a left rear perspective view of a forward end region of the draft tongue shown in FIG. 1, but also showing a rear end region of a towing tractor including a drawbar positioned ahead of the clevis defining the forward end of the draft tongue.

Referring now to FIGS. 1 and 2, there is shown a towed, PTO-driven implement 10, here shown as a large round baler including a frame 12 supported for movement over the ground by a pair of ground wheels 14 mounted for rotation about respective axles that lie along a horizontal, transverse axis about which the frame 12 may pivot. A draft tongue 16 is defined by forwardly converging side members (see FIG. 3) having their rear ends fixed to the frame 12 and which are inclined downwardly from the frame to forward ends joined by a clevis 18 having upper and lower plates containing aligned holes for receiving a hitch pin, which is adapted for passing through an opening in a rear region of a drawbar 22 (FIG. 2) of a towing vehicle 24, such as an agricultural tractor, so as to couple the implement 10 for being towed over the ground by the vehicle 24. A crop pick-up 26 is mounted to the frame 12 and serves to pick up a windrow of crop material lying on the ground and deliver it to an inlet (not visible) of a baling chamber formed in part by a plurality of bale-forming belts 28 mounted in side-by-side relationship across a plurality of fixed and movable belt support rolls (not shown), as is well known.

Power for driving a tine reel of the pick-up 26 and at least one of the fixed belt support rolls is derived from the towing vehicle 24 and is transferred from a PTO shaft 30 of the vehicle 24 to a telescopic shielded PTO drive shaft assembly 32 including a PTO drive shaft including a front shaft section provided with an elongate hollow rear connecting portion (not shown) provided with interior splines and a rear shaft section 34 (FIG. 4) having a front connecting end portion provided with splines 36 and being telescopically received in the rear connecting portion of the front shaft section. Provided at the front of the front shaft section is a front universal joint assembly 38 including a coupling part defining an interiorly splined receptacle adapted for coupling engagement with the PTO shaft 30 of the towing vehicle 24. A rear end of the rear shaft section 34 of the PTO drive shaft assembly 32 is similarly provided with an universal joint assembly (not shown) coupled to an input to a slip clutch 40 (see FIG. 4) having an output coupled to an input shaft of a bevel gear box 42 supported by the frame 12 at a central location between rear ends of the side members of the draft tongue 16. The height of a rear end of the drive shaft assembly 32 is approximately equal to the height of the vehicle PTO shaft 30, with the front and rear universal joint assemblies permitting the drive shaft to follow turning movements of the towing vehicle 24 relative to the implement 10.

As depicted in FIGS. 1 and 2, the implement 10 is in a parked condition wherein a screw jack 44 is provided for supporting the draft tongue 16 above the ground, with the clevis 18 being located at an approximate height for being connected to the drawbar 22 of the towing vehicle 24. Provided for releasably securing the jack 44 to the draft tongue 16 are first and third coupling members in the form of cylindrical, front and rear jack support members 46 (see FIG. 3) and 48, respectively, that are fixed to, and project leftwardly from a left face of the left-hand member of the draft tongue 16. Each of the jack support members 46 and 48 is provided with substantially vertical and horizontal throughbores. The jack 44 includes a cylindrical tubular body 50 to one side of which is rigidly fixed a second coupling member in the form of a tubular mounting receptacle 52, which is received over the front jack support member 46 and secured in place by a connecting pin 54 inserted through bores provided in the receptacle 38 and aligned with the horizontal throughbore provided in the front jack support member 46. It is here noted that the roles of the support members 46, 48 could be reversed with that of the mounting receptacle 52, in which case the support members 46, 48 would be formed as mounting receptacles, with the jack mounting receptacle 52 being formed as a support member which fits inside the mounting receptacles. In either case, respective coupling members of the tongue and jack cooperate to form a releasable coupling secured together by the connecting pin 54.

The tubular body 50 of the jack 44 telescopically receives a cylindrical leg member 56 terminating in a foot 58 engaged with the ground. An interiorly threaded member (not shown) is fixed within an upper end region of the leg member 56 and receives a threaded adjustment rod (not visible) which projects upwardly to the top of the jack body 50 and joined by a coupling member 60 to which a handle 62 is pivotally attached. When the handle 62 is turned about a longitudinal axis of the jack, the leg member 56 is caused to be moved lengthwise within the body 50 so as to effect length changes in the jack 44, as is well known.

To this point, what has been described is conventional, with it being known to support the shielded PTO drive shaft assembly 32 either on the forward end region of the tongue 16 or on the handle 62 of the jack 30 so as to keep the shaft assembly from contact with the ground and associated contaminants. Neither of these storage locations are desirable since the presence of PTO drive shaft assembly 32 on the clevis 18 tends to obscure the clevis holes when coupling to the towing vehicle drawbar 22, and the presence of the PTO shaft assembly 32 on the jack handle 62 prevents it from being used if there is a need to adjust the height of the clevis 18 for receiving the drawbar 22 of the towing vehicle 24, as might occur if the jack 44 sinks into soft ground, for example.

Figure 3:
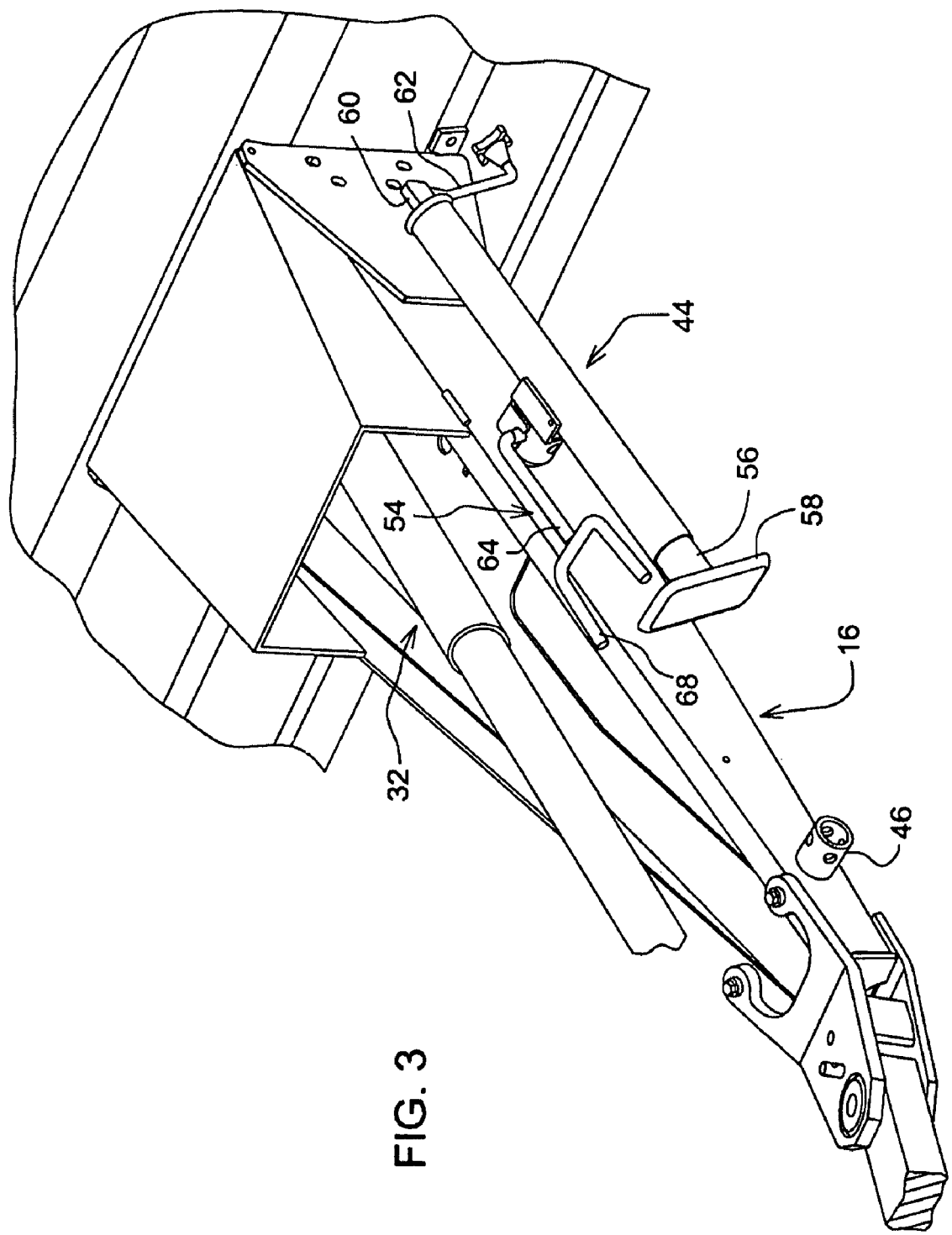
FIG. 3 is a left front perspective view of the draft tongue shown in FIG. 1, but with the tongue supported on the tractor drawbar and with the jack and associated connecting pin both being shown in stored positions.
Figure 4:
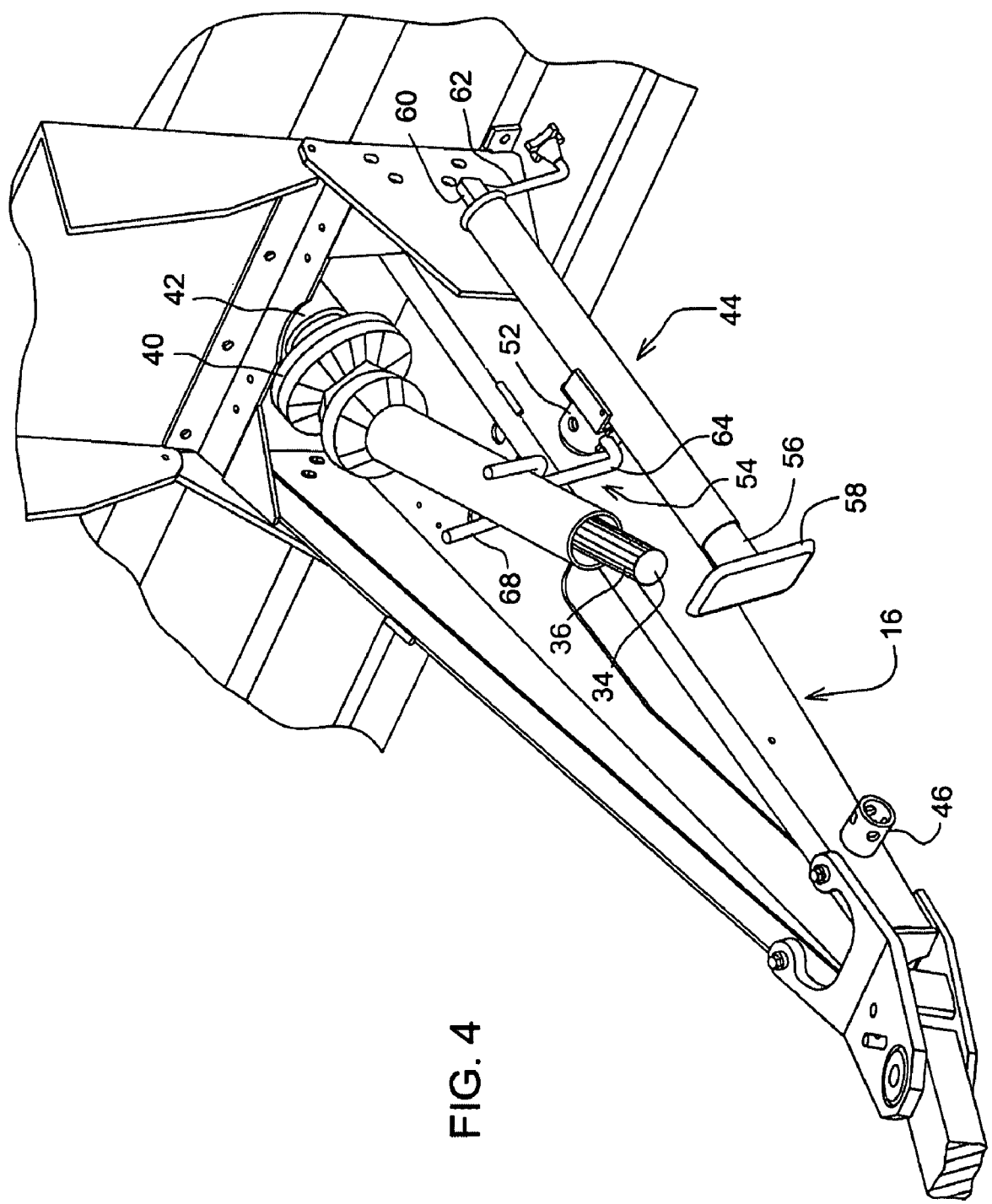
FIG. 4 is a view like, that of FIG. 3, but showing the connecting pin an alternate position wherein in it supports a rear section of the PTO drive shaft assembly during servicing the PTO drive shaft assembly.

The invention resides in the jack connecting pin 54 which includes an L-shaped section 64, with the short leg of the L being used to connect the receptacle 52 of the jack 44 either on the front jack support member 46, as shown in FIGS. 1 and 2, or on the rear jack support member 48, as shown in FIGS. 3 and 4. Fixed to the short leg of the L is a stop bracket 66 having the shape of a right angle and being sized such that one leg: extends beneath the receptacle 38 and engages it so as to limit rotation of the connecting pin 40 about its axis once installed. Fixed to the free end of the long leg of the L-shaped section 64 is a U-shaped cradle section 68, which is coplanar with, and forms an extension of, the long leg.

When the connecting pin 54 is installed in its preferred position for retaining the jack 44 for supporting the tongue 16 so as to establish the parking mode of the implement 10, as shown in FIGS. 1 and 2, the short leg of the L-shaped section 64 of the connecting pin 54 is inserted from rear-to-front through the receptacle 52 and the horizontal throughbore in the front jack support member 46. The long leg of the L-shaped section 64 of the mounting pin 54 is then positioned behind the jack 44 and extends parallel to the length of the jack 44, with the U-shaped cradle section 68 opening upwardly and having the PTO drive shaft assembly 32 received therein. This position of the connecting pin 54 is preferred for the reason that it disposes the cradle section 68 sufficiently to the rear of a bell section 70 at a forward end of a cylindrical, inner shaft shield section 72 that an operator has an ample length of the shield section 72 behind the bell section 70 to permit the shield section 72 to be grasped and lifted into place in the connecting pin cradle section 68 once the shaft assembly 32 has been disconnected from the towing vehicle PTO shaft 30. While not as favorable, it is clear that the connecting pin 54 could be rotated 180° from its position shown in FIG. 2, with the short leg of the L-shaped section 64 then being inserted from front-to-rear through the receptacle 52 and support member 46, with the result that the cradle section 68 would be located for receiving the shield section 72 at a location close to the bell section 70, thus requiring an operator to grasp the much larger bell section 70 or reach further to the rear in order to grasp the section 72. In any event, it should be noted that the cradle 68 could be shaped other that U-shaped, with it being necessary only to provide a stable supporting surface for the drive shaft assembly 32.

Referring now to FIGS. 3 and 4, the jack 44 is shown in its stored position, wherein the mounting receptacle 52 is engaged over the rear support member 48 and held in place by the connecting pin 54. As shown in FIG. 3, the short leg of the L-shaped section 64 of the connecting pin 54 is inserted vertically through the jack-mounting receptacle 52 and the vertical throughbore in the support member 48. The jack is then disposed in side-by-side relationship to the draft tongue 16, as is also the long leg of the L-shaped section 64 and the cradle section 68 of the connecting pin 64. Alternatively, the connecting pin 54 could be rotated 180° from its position shown in FIG. 3.

As shown in FIG. 4, the short leg of the L-shaped section 64 of the connecting pin 54 is shown inserted from front-to-rear in the mounting receptacle 52 and in the horizontal throughbore of the support member 48. The long leg of the L-shaped section 64 is disposed upwardly and inclined over the draft tongue 16, with a remaining portion of the shielded PTO drive shaft assembly 32, from which a forward portion has been removed, being located in the cradle 68. Thus, an operator would choose this orientation of the connecting pin 54 if service on the shaft assembly 32 is needed since the connecting pin 54 can then support the drive shaft assembly 32 in an elevated attitude better suited for having the forward portion of the assembly 32 disconnected from the supported rear portion.

Having described the preferred embodiment, it will become apparent that various modifications can be made without departing from the scope of the invention as defined in the accompanying claims.

The invention claimed is:

1. In a towed, PTO-driven implement including a draft tongue, a PTO drive shaft assembly extending generally above said draft tongue and a length-adjustable jack having a first coupling member extending substantially at a right angle to a length of said jack and cooperating with a second coupling member carried by said draft tongue so as to define a coupling when they are engaged with each other thereby mounting said jack for supporting the draft tongue above the ground when the implement is in a parked mode, and a connecting pin being inserted through aligned holes in said coupling for securing said jack in place, the improvement comprising: said connecting pin being shaped to include a PTO support defining an upwardly directed supporting surface upon which said PTO shaft may be placed for support when said connecting pin is received in said aligned holes.

2. The implement, as defined in claim 1, wherein said connecting pin includes an L-shaped section, with a short leg of said L-shaped section being oriented substantially horizontally in said coupling and with a long leg of said L-shaped section projecting upwardly; and a cradle section being secured to an upper end of said L-shaped section and including said supporting surface.

3. The implement, as defined in claim 2, wherein said cradle is U-shaped.

4. The implement, as defined in claim 3, wherein said cradle, as viewed from a side, is aligned with said long leg of said L-shaped section of said connecting pin.

5. The implement, as defined in claim 1, and further including a third coupling member that is substantially identical to said second coupling member and is fixed to said draft tongue at a location spaced rearward from said second coupling member; and said jack being selectively mountable to said third coupling member in a stored position wherein said first coupling member is engaged with said third coupling member so as to define a second coupling containing aligned holes in which said connecting pin is inserted so as to hold said coupling together, with said support surface of said PTO support extending upwardly in a position for having said PTO drive shaft assembly received thereon for support when service is being performed on said PTO drive shaft assembly.

* * * * *